US012530305B2

(12) United States Patent
Balakrishnan (10) Patent No.: US 12,530,305 B2
(45) Date of Patent: Jan. 20, 2026

(54) MEMORY ENCRYPTION

(71) Applicant: Advanced Micro Devices, Inc., Santa Clara, CA (US)

(72) Inventor: Kedarnath Balakrishnan, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 912 days.

(21) Appl. No.: 17/714,596

(22) Filed: Apr. 6, 2022

(65) Prior Publication Data

US 2023/0325326 A1 Oct. 12, 2023

(51) Int. Cl.
*G06F 12/14* (2006.01)
*H04L 9/06* (2006.01)

(52) U.S. Cl.
CPC ........ *G06F 12/1408* (2013.01); *H04L 9/0631* (2013.01); *G06F 2212/1052* (2013.01)

(58) Field of Classification Search
CPC ........ G06F 12/1408; G06F 2212/1052; G06F 2212/152; H04L 9/0631
See application file for complete search history.

(56) References Cited

U.S. PATENT DOCUMENTS

| | | | |
|---|---|---|---|
| 2012/0079285 A1* | 3/2012 | Gueron | G06F 21/52 713/190 |
| 2016/0182223 A1* | 6/2016 | Kishinevsky | H04L 9/0631 380/28 |
| 2016/0285892 A1* | 9/2016 | Kishinevsky | G06F 12/1408 |
| 2019/0102577 A1* | 4/2019 | Gueron | G06F 21/79 |
| 2019/0199363 A1 | 6/2019 | Kosonocky | |
| 2021/0119780 A1* | 4/2021 | Hassan | H04L 9/088 |

OTHER PUBLICATIONS

Wikipedia entry for "Disk encryption theory" from Feb. 11, 2021 retrieved at https://web.archive.org/web/20210211193938/https://en.wikipedia.org/wiki/Disk_encryption_theory#XTS on Feb. 11, 2025.*
"IEEE Standard for Cryptographic Protection of Data on Block-Oriented Storage Devices," in IEEE Std 1619-2018 (Revision of IEEE Std 1619-2007), vol. no., pp. 1-41, Jan. 25, 2019.*

* cited by examiner

*Primary Examiner* — Matthew T Henning
(74) *Attorney, Agent, or Firm* — Polansky & Associates, P.L.L.C.; Paul J. Polansky; Nathan H. Calvert (57) ABSTRACT

A memory controller includes encryption circuits for encrypting write data to be written to an address in a RAM memory. A tweak value is provided based at least on the address. The tweak value is encrypted with Advanced Encryption Standard (AES) encryption using a first key. A first block write data is encrypted by manipulating it based on the encrypted tweak value, AES encrypting with a second key, and then manipulating the result based on the encrypted tweak value again. For subsequent blocks of write data, the encrypted tweak value is modified, and a similar operation is performed.

15 Claims, 7 Drawing Sheets

MEMORY ENCRYPTION

BACKGROUND

Computer systems typically use inexpensive and high density dynamic random access memory (DRAM) chips for main memory. Most DRAM chips sold today are compatible with various double data rate (DDR) DRAM standards promulgated by the Joint Electron Devices Engineering Council (JEDEC). DDR DRAMs use conventional DRAM memory cell arrays with high-speed access circuits to achieve high transfer rates and to improve the utilization of the memory bus.

In a typical computer system, data stored in DRAM memory is not encrypted by the memory controller or the memory module. However, many modern computer system architectures perform functions in which data security might be compromised for data stored in DRAM. For example, in a server hosting virtual computers with multiple instances of an operating system all using the DRAM memory, it is sometimes possible for data stored in DRAM by one virtual machine to be accessed by a different virtual machine, either accidentally or deliberately. In another example, while an application may encrypt a file or database for storage in nonvolatile memory such as a solid state drive, a computer virus or worm can be constructed to circumvent such encryption by accessing data as the data is used in DRAM where it is unencrypted.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A memory controller includes a data buffer and an encryption circuit connected to the data buffer for encrypting write data of a write command to be written to a RAM memory. The encryption circuit includes a first block cipher encryption circuit, a second block cipher encryption circuit, and at least one subsequent block cipher encryption circuit. The first block cipher encryption circuit has a first input receiving a first key and a second input receiving a tweak value based at least on an address of the write command, and an output providing an encrypted tweak value. The second block cipher encryption circuit receives a second key, the encrypted tweak value, and a first block of the write data, and encrypts the first block of the write data by manipulating the write data with the encrypted tweak value, encrypting a first result thereof with a second key, and then manipulating a second result thereof based on the encrypted tweak value again to provide a first block of encrypted write data. Each subsequent block cipher encryption circuit receives the second key, a modified encrypted tweak value from a prior one of the block cipher encryption circuits, and a subsequent block of the write data, and encrypts the subsequent block of write data by manipulating the modified encrypted tweak value and the subsequent block of write data, encrypting a third result thereof with the second key, and then manipulating a fourth result thereof based on the modified encrypted tweak value again to produce a subsequent block of encrypted write data.

A method includes receiving a write command at a memory controller having an address and write data to be written to the address in a RAM memory. A tweak value is provided based at least on the address. The tweak value is encrypted with a block cipher encryption circuit using a first key to produce an encrypted tweak value. A first block of the write data is encrypted by manipulating it based on the encrypted tweak value using a first digital circuit, encrypting a first result thereof with a second key at a first block cipher encryption circuit, and then manipulating a second result thereof based on the encrypted tweak value again using a second digital circuit to provide a first block of encrypted write data. For at least one subsequent block of write data, the encrypted tweak value is modified, and the subsequent block of write data is encrypted by manipulating it based on the modified encrypted tweak value, encrypting a third result thereof with the second key using a subsequent block cipher encryption circuit, and then manipulating a fourth result thereof based on the modified encrypted tweak value to provide a subsequent block of encrypted write data. The first and subsequent blocks of encrypted write data are loaded to a data buffer. The write command is selected by an arbiter circuit for transmission to the RAM memory. The write command and the first and subsequent blocks of encrypted write data are transmitted to the RAM memory.

A data processing system includes a data processor, a data fabric coupled to the data processor and a memory controller coupled to the data fabric. The memory controller includes a data buffer and an encryption circuit connected to the data buffer for encrypting write data of a write command to be written to a RAM memory. The encryption circuit includes a first block cipher encryption circuit, a second block cipher encryption circuit, and at least one subsequent block cipher encryption circuit. The first block cipher encryption circuit has a first input receiving a first key and a second input receiving a tweak value based at least on an address of the write command, and an output providing an encrypted tweak value. The second block cipher encryption circuit receives a second key, the encrypted tweak value, and a first block of the write data, and encrypts the first block of the write data by manipulating the write data based on the encrypted tweak value, encrypting a first result thereof with a second key, and then manipulating a second result thereof based on the encrypted tweak value again to provide a first block of encrypted write data. Each subsequent block cipher encryption circuit receives the second key, a modified encrypted tweak value from a prior one of the block cipher encryption circuits, and a subsequent block of the write data, and encrypts the subsequent block of write data by manipulating the modified encrypted tweak value and the subsequent block of write data, encrypting a third result thereof with the second key, and then manipulating a fourth result thereof with the modified encrypted tweak value again to produce a subsequent block of encrypted write data.

Figure 1:
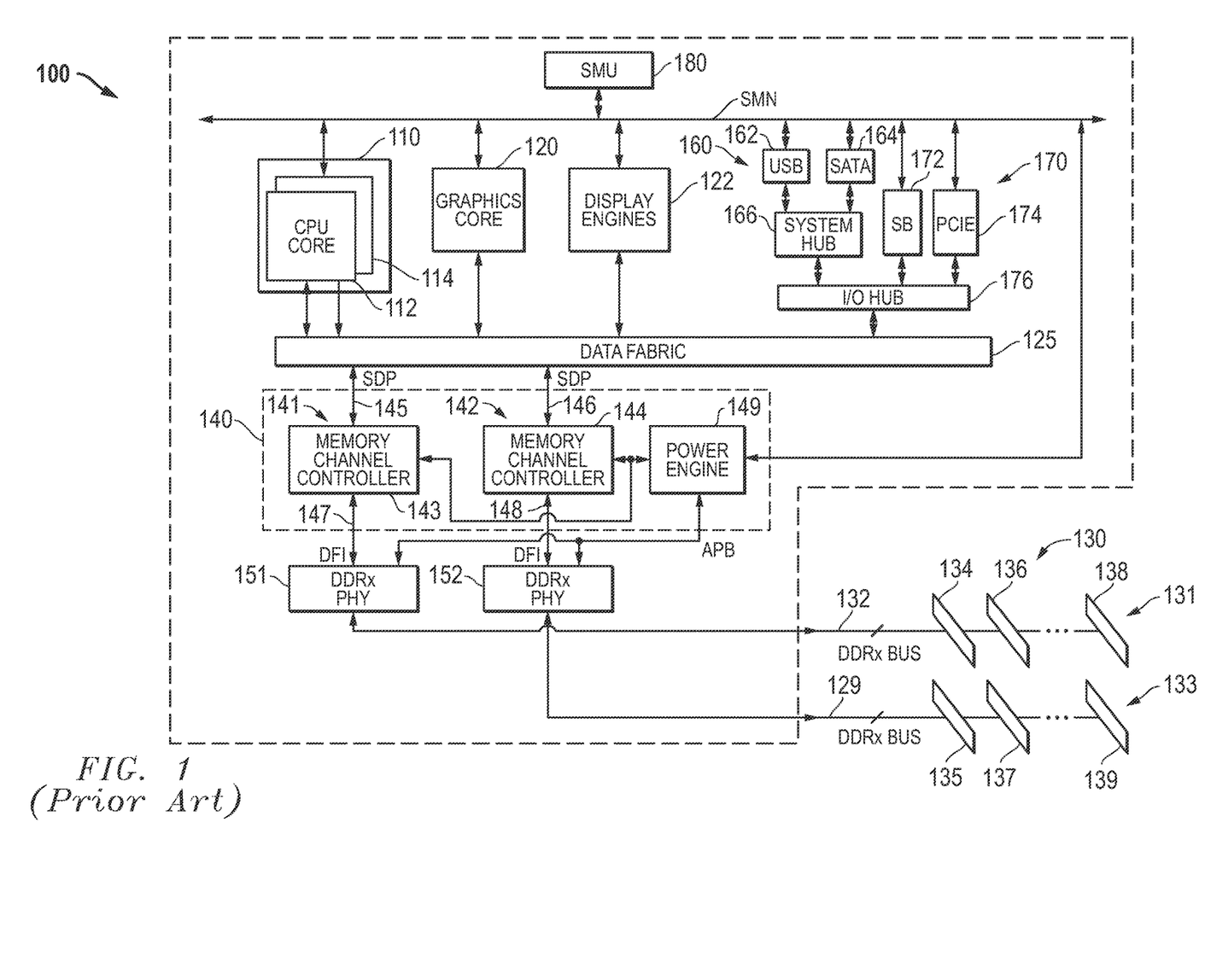
FIG. 1 illustrates in block diagram form an accelerated processing unit (APU) and memory system known in the prior art.

FIG. 1 illustrates in block diagram form an accelerated processing unit (APU) 100 and memory system 130 known in the prior art. APU 100 is an integrated circuit suitable for use as a processor in a host data processing system, and includes generally a central processing unit (CPU) core complex 110, a graphics core 120, a set of display engines 122, a data fabric 125, a memory management hub 140, a set of peripheral controllers 160, a set of peripheral bus controllers 170, and a system management unit (SMU) 180.

CPU core complex 110 includes a CPU core 112 and a CPU core 114. In this example, CPU core complex 110 includes two CPU cores, but in other embodiments CPU core complex 110 can include an arbitrary number of CPU cores. Each of CPU cores 112 and 114 is bidirectionally connected to a system management network (SMN), which forms a control fabric, and to data fabric 125, and is capable of providing memory access requests to data fabric 125. Each of CPU cores 112 and 114 may be unitary cores, or may further be a core complex with two or more unitary cores sharing certain resources such as caches.

Graphics core 120 is a high performance graphics processing unit (GPU) capable of performing graphics operations such as vertex processing, fragment processing, shading, texture blending, and the like in a highly integrated and parallel fashion. Graphics core 120 is bidirectionally connected to the SMN and to data fabric 125, and is capable of providing memory access requests to data fabric 125. In this regard, APU 100 may either support a unified memory architecture in which CPU core complex 110 and graphics core 120 share the same memory space, or a memory architecture in which CPU core complex 110 and graphics core 120 share a portion of the memory space, while graphics core 120 also uses a private graphics memory not accessible by CPU core complex 110.

Display engines 122 render and rasterize objects generated by graphics core 120 for display on a monitor. Graphics core 120 and display engines 122 are bidirectionally connected to a common memory management hub 140 through data fabric 125 for uniform translation into appropriate addresses in memory system 130.

Data fabric 125 includes a crossbar switch for routing memory access requests and memory responses between any memory accessing agent and memory management hub 140. It also includes a system memory map, defined by basic input/output system (BIOS), for determining destinations of memory accesses based on the system configuration, as well as buffers for each virtual connection.

Peripheral controllers 160 include a universal serial bus (USB) controller 162 and a Serial Advanced Technology Attachment (SATA) interface controller 164, each of which is bidirectionally connected to a system hub 166 and to the SMN bus. These two controllers are merely exemplary of peripheral controllers that may be used in APU 100.

Peripheral bus controllers 170 include a system controller or "Southbridge" (SB) 172 and a Peripheral Component Interconnect Express (PCIe) controller 174, each of which is bidirectionally connected to an input/output (I/O) hub 176 and to the SMN bus. I/O hub 176 is also bidirectionally connected to system hub 166 and to data fabric 125. Thus for example a CPU core can program registers in USB controller 162, SATA interface controller 164, SB 172, or PCIe controller 174 through accesses that data fabric 125 routes through I/O hub 176. Software and firmware for APU 100 are stored in a system data drive or system BIOS memory (not shown) which can be any of a variety of non-volatile memory types, such as read-only memory (ROM), flash electrically erasable programmable ROM (EEPROM), and the like. Typically, the BIOS memory is accessed through the PCIe bus, and the system data drive through the SATA interface.

SMU 180 is a local controller that controls the operation of the resources on APU 100 and synchronizes communication among them. SMU 180 manages power-up sequencing of the various processors on APU 100 and controls multiple off-chip devices via reset, enable and other signals. SMU 180 includes one or more clock sources (not shown), such as a phase locked loop (PLL), to provide clock signals for each of the components of APU 100. SMU 180 also manages power for the various processors and other functional blocks, and may receive measured power consumption values from CPU cores 112 and 114 and graphics core 120 to determine appropriate power states.

Memory management hub 140 and its associated physical interfaces (PHYs) 151 and 152 are integrated with APU 100 in this embodiment. Memory management hub 140 includes memory channels 141 and 142 and a power engine 149. Memory channel 141 includes a host interface 145, a memory channel controller 143, and a physical interface 147. Host interface 145 bidirectionally connects memory channel controller 143 to data fabric 125 over a serial presence detect link (SDP). Physical interface 147 bidirectionally connects memory channel controller 143 to PHY 151, and conforms to the DDR PHY Interface (DFI) Specification. Memory channel 142 includes a host interface 146, a memory channel controller 144, and a physical interface 148. Host interface 146 bidirectionally connects memory channel controller 144 to data fabric 125 over another SDP. Physical interface 148 bidirectionally connects memory channel controller 144 to PHY 152, and conforms to the DFI Specification. Power engine 149 is bidirectionally connected to SMU 180 over the SMN bus, to PHYs 151 and 152 over the APB, and is also bidirectionally connected to memory channel controllers 143 and 144. PHY 151 has a bidirectional connection to memory channel 131. PHY 152 has a bidirectional connection memory channel 133.

Memory management hub 140 is an instantiation of a memory controller having two memory channel controllers and uses a shared power engine 149 to control operation of both memory channel controller 143 and memory channel controller 144 in a manner that will be described further below. Each of memory channels 141 and 142 can connect to state-of-the-art DDR memories such as DDR version five (DDR5), DDR version four (DDR4), low power DDR4 (LPDDR4), graphics DDR version five (GDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

Memory system 130 includes a memory channel 131 and a memory channel 133. Memory channel 131 includes a set of dual inline memory modules (DIMMs) connected to a DDRx bus 132, including representative DIMMs 134, 136, and 138 that in this example correspond to separate ranks. Likewise, memory channel 133 includes a set of DIMMs connected to a DDRx bus 129, including representative DIMMs 135, 137, and 139.

APU 100 operates as the central processing unit (CPU) of a host data processing system and provides various buses and interfaces useful in modern computer systems. These interfaces include two double data rate (DDRx) memory channels, a PCIe root complex for connection to a PCIe link, a USB controller for connection to a USB network, and an interface to a SATA mass storage device.

APU 100 also implements various system monitoring and power saving functions. In particular one system monitoring function is thermal monitoring. For example, if APU 100 becomes hot, then SMU 180 can reduce the frequency and voltage of CPU cores 112 and 114 and/or graphics core 120. If APU 100 becomes too hot, then it can be shut down entirely. Thermal events can also be received from external sensors by SMU 180 via the SMN bus, and SMU 180 can reduce the clock frequency and/or power supply voltage in response.

Figure 2:
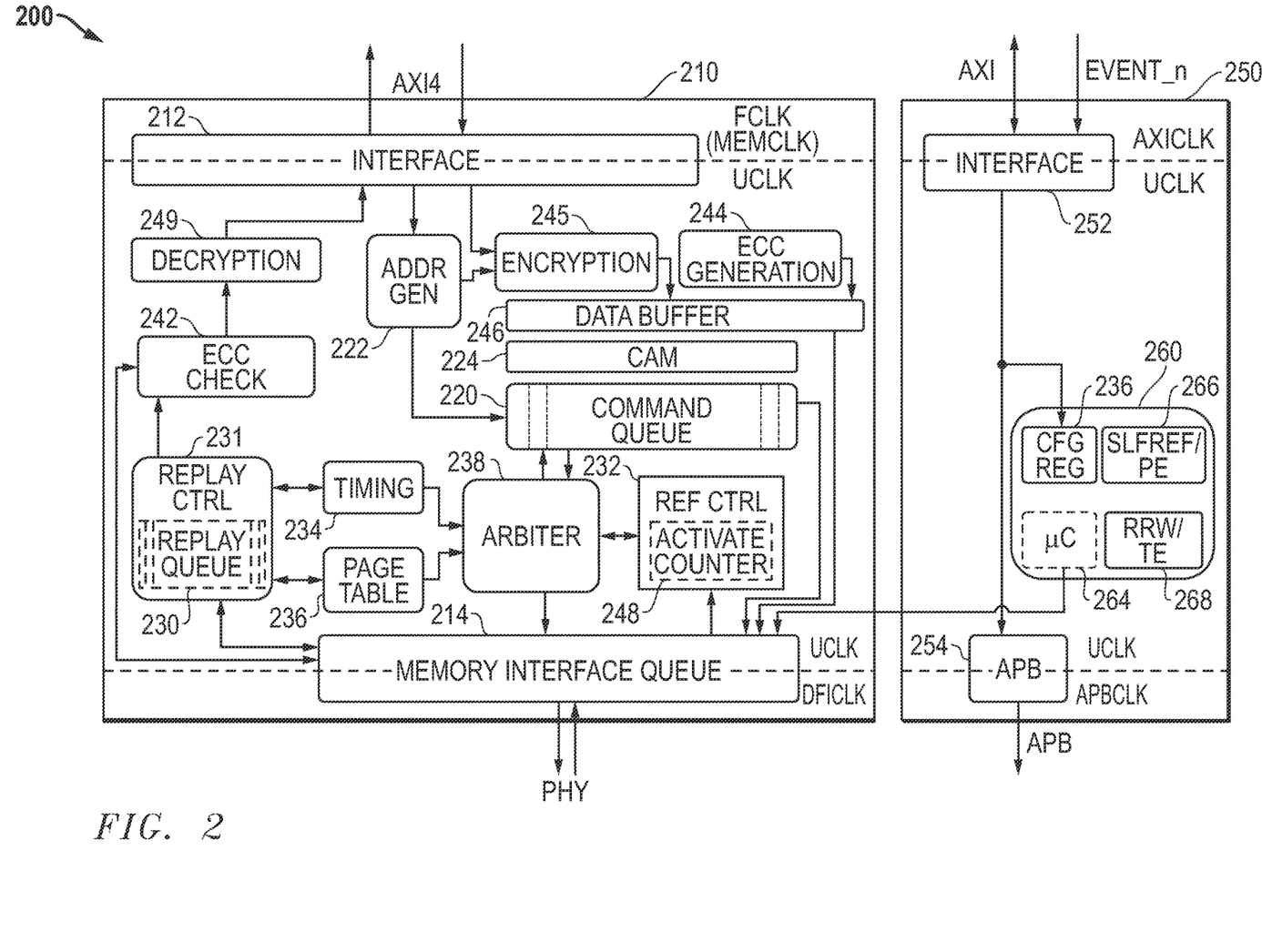
FIG. 2 illustrates in block diagram form a memory controller suitable for use in an APU like that of FIG. 1 according to some embodiments.

FIG. 2 illustrates in block diagram form a memory controller 200 that is suitable for use in an APU like that of FIG. 1. Memory controller 200 includes generally a memory channel controller 210 and a power controller 250. Memory channel controller 210 includes generally an interface 212, a memory interface queue 214, a command queue 220, an address generator 222, a content addressable memory (CAM) 224, replay control logic 231 including a replay queue 230, a refresh control logic block 232, a timing block 234, a page table 236, an arbiter 238, an error correction code (ECC) check circuit 242, an ECC generation block 244, an encryption circuit 245, a data buffer 246, refresh logic 232, and a decryption circuit 249.

Interface 212 has a first bidirectional connection to data fabric 125 over an external bus, and has an output. In memory controller 200, this external bus is compatible with the advanced extensible interface version four specified by ARM Holdings, PLC of Cambridge, England, known as "AXI4", but can be other types of interfaces in other embodiments. Interface 212 translates memory access requests from a first clock domain known as the FCLK (or MEMCLK) domain to a second clock domain internal to memory controller 200 known as the UCLK domain. Similarly, memory interface queue 214 provides memory accesses from the UCLK domain to a DFICLK domain associated with the DFI interface.

Address generator 222 decodes addresses of memory access requests received from data fabric 125 over the AXI4 bus. The memory access requests include access addresses in the physical address space represented in a normalized format. Address generator 222 converts the normalized addresses into a format that can be used to address the actual memory devices in memory system 130, as well as to efficiently schedule related accesses. This format includes a region identifier that associates the memory access request with a particular rank, a row address, a column address, a bank address, and a bank group. On startup, the system BIOS queries the memory devices in memory system 130 to determine their size and configuration, and programs a set of configuration registers associated with address generator 222. Address generator 222 uses the configuration stored in the configuration registers to translate the normalized addresses into the appropriate format. Command queue 220 is a queue of memory access requests received from the memory accessing agents in APU 100, such as CPU cores 112 and 114 and graphics core 120. Command queue 220 stores the address fields decoded by address generator 222 as well other address information that allows arbiter 238 to select memory accesses efficiently, including access type and quality of service (QoS) identifiers. CAM 224 includes information to enforce ordering rules, such as write after write (WAW) and read after write (RAW) ordering rules.

Error correction code (ECC) generation block 244 determines the ECC of write data to be sent to the memory.

Replay queue 230 is a temporary queue for storing selected memory accesses picked by arbiter 238 that are awaiting responses, such as address and command parity responses. Replay control logic 231 accesses ECC check circuit 242 to determine whether the returned ECC is correct or indicates an error. Replay control logic 231 initiates and controls a replay sequence in which accesses are replayed in the case of a parity or ECC error of one of these cycles. Replayed commands are placed in the memory interface queue 214.

Refresh control logic 232 includes state machines for various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. Refresh control logic 232 generates refresh commands periodically and in response to designated conditions to prevent data errors caused by leaking of charge off storage capacitors of memory cells in DRAM chips. Refresh control logic 232 includes an activate counter 248, which in this embodiment has a counter for each memory region which counts a rolling number of activate commands sent over the memory channel to a memory region. The memory regions are memory banks in some embodiments, and memory sub-banks in other embodiments as further discussed below. In addition, refresh control logic 232 periodically calibrates ZQ to prevent mismatch in on-die termination resistance due to thermal changes in the system.

Arbiter 238 is bidirectionally connected to command queue 220 and is the heart of memory channel controller 210, and improves efficiency by intelligent scheduling of accesses to improve the usage of the memory bus. Arbiter 238 uses timing block 234 to enforce proper timing relationships by determining whether certain accesses in command queue 220 are eligible for issuance based on DRAM timing parameters. For example, each DRAM has a minimum specified time between activate commands, known as "$t_{RC}$". Timing block 234 maintains a set of counters that determine eligibility based on this and other timing parameters specified in the JEDEC specification, and is bidirectionally connected to replay queue 230. Page table 236 maintains state information about active pages in each bank and rank of the memory channel for arbiter 238, and is bidirectionally connected to replay queue 230.

Encryption circuit 245 has a first input connected to interface 212, a second input connected to address generator 222, and an output connected to data buffer 246. In response to write memory access requests received from interface 212, encryption circuit 245 encrypts the write data with a designated encryption key and loads the encrypted data into data buffer 246, as further described below. ECC generation block 244 computes an ECC according to the encrypted write data. Data buffer 246 stores the encrypted write data and ECC for received memory access requests. It outputs the combined encrypted write data/ECC to memory interface queue 214 when arbiter 238 picks the corresponding write access for dispatch to the memory channel.

ECC check circuit 242 has an input connected to memory interface queue 214 for receiving data read from memory in response to read commands. ECC check circuit calculates an ECC of the received encrypted data from memory. The calculated ECC is compared against the ECC carried with the incoming read data to determine if an error is present in the read data.

Decryption circuit 249 has an input connected to ECC check circuit 242, and an output connected to interface 212. In response to read memory access requests received from interface 212, the read data is received over the PHY at decryption circuit 249 after an appropriate read command is selected and dispatched to the memory and the command is fulfilled by the memory. Unencrypted data will bypass the decryption process. Decryption circuit 249 decrypts the read data with a designated encryption key after the encrypted data passes the ECC check process at ECC check circuit 242.

Power controller 250 generally includes an interface 252 to an advanced extensible interface, version one (AXI), an advanced peripheral bus (APB) interface 254, and a power engine 260. Interface 252 has a first bidirectional connection to the SMN, which includes an input for receiving an event signal labeled "EVENT_n" shown separately in FIG. 2, and an output. APB interface 254 has an input connected to the output of interface 252, and an output for connection to a PHY over an APB. Power engine 260 has an input connected to the output of interface 252, and an output connected to an input of memory interface queue 214. Power engine 260 includes a set of configuration registers 262, a microcontroller (µC) 264, a self refresh controller (SLFREF/PE) 266, and a reliable read/write timing engine (RRW/TE) 268. Configuration registers 262 are programmed over the AXI bus, and store configuration information to control the operation of various blocks in memory controller 200. Accordingly, configuration registers 262 have outputs connected to these blocks that are not shown in detail in FIG. 2. Self refresh controller 266 is an engine that allows the manual generation of refreshes in addition to the automatic generation of refreshes by refresh control logic 232. Reliable read/write timing engine 268 provides a continuous memory access stream to memory or I/O devices for such purposes as DDR interface maximum read latency (MRL) training and loopback testing.

Memory channel controller 210 includes circuitry that allows it to pick memory accesses for dispatch to the associated memory channel. In order to make the desired arbitration decisions, address generator 222 decodes the address information into predecoded information including rank, row address, column address, bank address, and bank group in the memory system, and command queue 220 stores the predecoded information. Configuration registers 262 store configuration information to determine how address generator 222 decodes the received address information. Arbiter 238 uses the decoded address information, timing eligibility information indicated by timing block 234, and active page information indicated by page table 236 to efficiently schedule memory accesses while observing other criteria such as quality of service (QoS) requirements. For example, arbiter 238 implements a preference for accesses to open pages to avoid the overhead of precharge and activation commands required to change memory pages, and hides overhead accesses to one bank by interleaving them with read and write accesses to another bank. In particular during normal operation, arbiter 238 normally keeps pages open in different banks until they are required to be precharged prior to selecting a different page. Arbiter 238, in some embodiments, determines eligibility for command selection based on at least on respective values of activate counter 248 for target memory regions of the respective commands.

Figure 3:
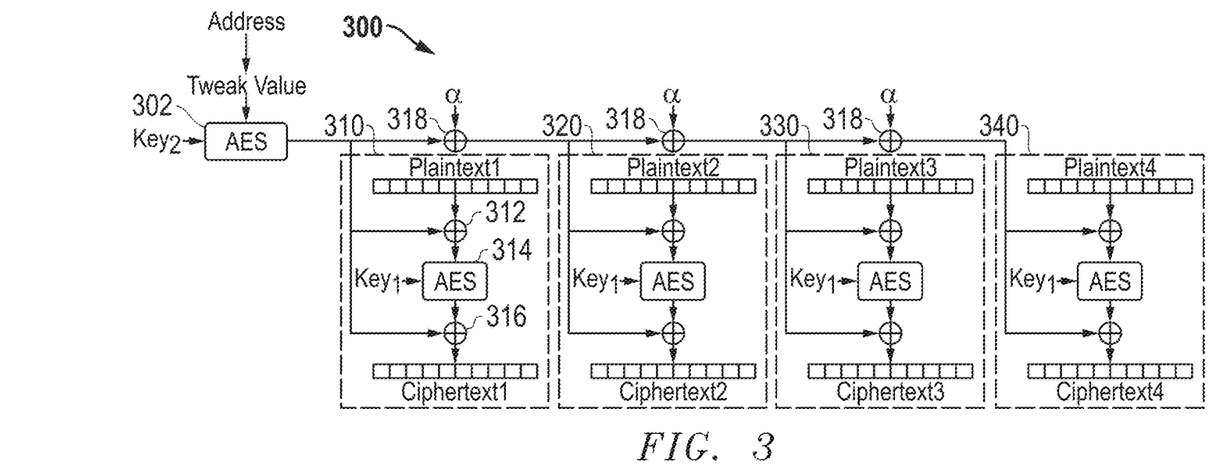
FIG. 3 shows in block diagram form an encryption circuit for a memory controller according to some embodiments.

FIG. 3 shows in block diagram form an encryption circuit 300 for a memory controller according to some embodiments. Generally, encryption circuit 300 is connected to the data buffer of a memory controller, such as memory controller 210 of FIG. 2 for encrypting write data to be written to a RAM memory, using an encryption key "$Key_1$" for encrypting data and an encryption key "$Key_2$" for encrypting a tweak value which is then varied and used to scramble the data for further security. Encryption circuit 300 includes an Advanced Encryption Standard (AES) block cipher encryption circuit 302, three Galois multiplication circuits 318, a second AES block cipher encryption circuit 310, and three subsequent AES block cipher encryption circuits 320, 330, and 340.

AES block cipher encryption circuit 302 is a digital logic block performing AES encryption of a tweak value received at one input. AES block cipher encryption circuit 302 has a first input receiving encryption key $Key_2$, and a second input receiving a tweak value which is based on an address of the write command. AES block cipher encryption circuit 302 performs AES encryption on the tweak value, and provides the encrypted tweak value as an output.

AES block cipher encryption circuit 310 has an input receiving a block of write data to be encrypted (labeled "Plaintext1"), an input receiving encryption key $Key_1$, and an output connected to the memory controller data buffer for providing encrypted write data ("Ciphertext1"). An exclusive-OR (XOR) circuit 312 receives the encrypted tweak value and Plaintext1 and performs an XOR operation of these two values to encrypt or scramble the plaintext data for additional security. The result is passed to AES encryption block 314 which performs AES encryption on it using $Key_1$. The resulting data is then passed to XOR circuit 316, which performs a second XOR operation on it with the encrypted tweak value to produce Ciphertext1.

Because a tweak value is needed for each the other AES block cipher encryption circuits 320, 330, and 340, but using the same value may result in identical ciphertext when identical plaintext data is encrypted, the tweak value is modified before each block. In this embodiment, such modification is performed using Galois multiplication by multiplication circuits 318. As shown, each multiplication circuit 318 is connected to receive the encrypted tweak value from the prior block, with any modifications, thereby altering the encrypted tweak value used for each AES block cipher encryption circuit. Each multiplication circuit also receives a primitive element value "α" with which to perform Galois field multiplication according to known techniques. Other suitable alteration circuits may be used to scramble or alter the encrypted tweak value in a manner that can be replicated later for decryption.

AES block cipher encryption circuits 320, 330, and 340 each have an input receiving $Key_1$, an input receiving a modified version of the encrypted tweak value from a prior one of the AES block cipher encryption circuits, an input receiving a subsequent block of the write data ("Plaintext2", "Plaintext3", and "Plaintext4"), and an output providing a block of encrypted write data ("Ciphertext2", "Ciphertext3", "Ciphertext4"). AES block cipher encryption circuits 320, 330, and 340 are constructed similarly to AES block cipher encryption circuit 310, encrypting their respective blocks of plaintext write data by XOR-ing the modified encrypted tweak value and the subsequent block of write data, AES encrypting with the second key, and then XOR-ing with the modified encrypted tweak value again to produce a subsequent block of encrypted write data.

In this embodiment, the amount of write data encrypted for each write command is an entire cache line of 64 bytes, with each block cipher encryption circuit encrypting a 16-byte block of data. As such, the tweak value is based on the address of the memory access request and can vary, for example, according to the base address of the block of data. Preferably the block of data is the size of a cache line or memory row. The original tweak value may be the address itself, or the address with some initial unused address bits modified to include additional data, such as a key ID associated with the encryption key used to encrypt the data.

While AES encryption is used in this embodiment, other embodiments employ different types of block cipher encryption. For example, elliptical curve encryption is used in some embodiments. Other embodiments use other types of block cipher encryption, which are selected based on the encryption strength for the desired security level and the efficiency of implementation in digital logic blocks.

Figure 4:
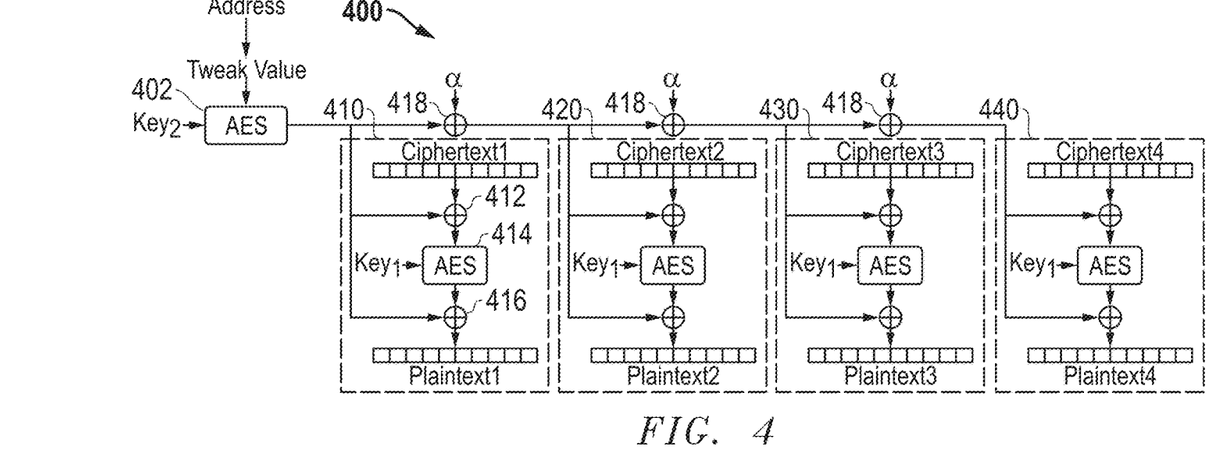
FIG. 4 shows in block diagram form a decryption circuit for a memory controller according to some embodiments.

FIG. 4 shows in block diagram form a decryption circuit 400 for a memory controller according to some embodiments. Generally, decryption circuit 400 is provided in the memory controller and employed in response to memory read requests to decrypt data that was previously encrypted by encryption circuit 300, in which the encryption is performed after the encrypted data is read from memory. The decryption uses the same encryption keys, $Key_1$ for decrypting data and $Key_2$ for encrypting a tweak value which is then varied for each block of decrypted data and used for decryption or descrambling operations. Decryption circuit 400 includes an AES block cipher encryption circuit 402, three Galois multiplication circuits 318, an AES block cipher decryption circuit 410, and three subsequent AES block cipher decryption circuits 420, 430, and 440.

AES block cipher encryption circuit 402 is a digital logic block performing AES encryption of a tweak value, and in some embodiments is shared with encryption circuit 300 for performing encryption of tweak values for use in either circuit. AES block cipher encryption circuit 402 has a first input receiving $Key_2$ and a second input receiving a tweak value based on an address of the read command. The tweak value is generated, based on the address, in the same manner as the tweak value described with respect to FIG. 3, providing a tweak value for decryption identical to the tweak value used for encryption. AES block cipher encryption circuit 302 performs AES encryption on the tweak value, and provides the encrypted tweak value as an output.

AES block cipher decryption circuit 410 receives $Key_1$, the encrypted tweak value, and a first block of read data "Ciphertext1". XOR circuit 412 encrypts Ciphertext1 by XOR-ing with the encrypted tweak value. The result is fed to AES block cipher decryption circuit 414, which AES decrypts the result using $Key_1$. The output of AES clock cipher decryption circuit 414 is fed to XOR circuit 416, which XORs with the encrypted tweak value again to provide a first block of decrypted read data "Plaintext4)".

Similarly to encryption circuit 300, a series of Galois multiplication circuits 418 are used to modify the encrypted tweak value three times, and provide the modified values to AES block cipher decryption circuits 420, 430, and 440, respectively. As shown, each multiplication circuit 418 is connected to receive the encrypted tweak value from the prior block, with any modifications, thereby altering the encrypted tweak value used for each AES block cipher encryption circuit. Each multiplication circuit also receives a value "α", identical to that used in the encryption process, with which to perform Galois multiplication.

AES block cipher decryption circuits 420, 430, and 440 each have an input receiving $Key_1$, an input receiving a respective modified version of the encrypted tweak value from a prior one of the AES block cipher encryption circuits, an input receiving a subsequent block of the read data ("Ciphertext2", "Ciphertext3", "Ciphertext4"), and an output providing a block of decrypted read data ("Plaintext2", "Plaintext3", and "Plaintext4"). AES block cipher decryption circuits 420, 430, and 440 are constructed similarly to AES block cipher decryption circuit 410, decrypting their respective blocks of ciphertext read data by XOR-ing the modified encrypted tweak value and the subsequent block of write data, AES decrypting with the second key, and then XOR-ing with the modified encrypted tweak value again to produce a subsequent block of decrypted write data.

As discussed with respect to the encryption circuit of FIG. 3, other embodiments employ other types of block cipher encryption besides AES.

While FIG. 4 shows the encrypted tweak value provided by AES block cipher encryption circuit 402, some embodiments also include a buffer to store recently-used encrypted tweak values in a manner associated with their respective memory addresses and provide them directly to AES block cipher decryption circuit 410. Such a buffer helps to speed operation of decryption circuit 400 by avoid the wait time associated with AES block cipher encryption circuit 402 providing the encrypted tweak value.

Figure 5:
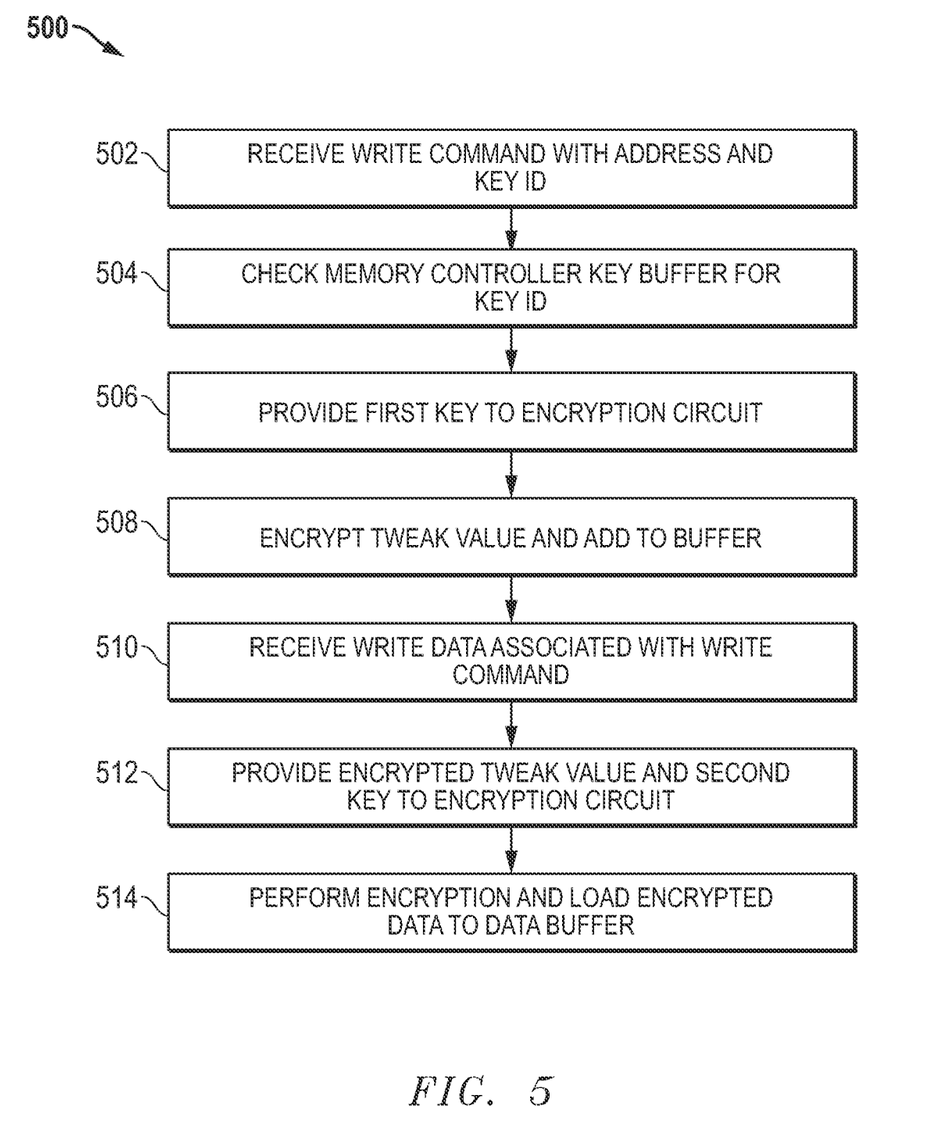
FIG. 5 shows a flowchart of a process for operating an encryption circuit like that of FIG. 3 for encrypting data associated with a write command according to some embodiments.

FIG. 5 shows a flowchart 500 of a process for operating an encryption circuit like that of FIG. 3 for encrypting data associated with a write command according to some embodiments. At block 502, a write command or request is received at the memory controller including an associated address to which data is to be written, and a key ID. The key ID identifies an AES encryption key for encrypting the data, typically a key which the process or application providing the command has authority to access under security protocols provided by the host operating system or security controller. Note that in some embodiments, at this point the write data for the write command may or may not have been received at the memory controller because the write data is typically provided on a separate data link with separate link buffers than the link on which memory access commands are to the memory controller.

At block 504, the process checks a key buffer in the memory controller to see if keys are held there associated with the key ID. If not, the process may return an error for the write command, or may request access to the keys from a security controller. If the desired keys are found in the key buffer, or obtained through a request, the process provides the keys to an encryption circuit at block 506. Preferably, both $Key_1$ and $Key_2$, to be used in encrypting the write data, are provided in this manner. In other embodiments, $Key_2$ is unique to a process or virtual machine ID which has authority to access the memory space for data being encrypted.

At block 508, the process provides a tweak value based on the address, and encrypts the tweak value using $Key_2$ as described with respect to FIG. 4. Block 508 may also include adding the encrypted tweak value to an encrypted tweak value buffer in the memory controller for later use in decrypting data read from the memory.

At block 510, the write data associated with the write command is received at the memory controller. While flowchart 500 shows block 510 occurring after block 508, this order is not limiting and the write data often begins to be received at the memory controller when the write command is received. When the write data has been received, the memory controller at block 512 provides the encrypted tweak value and $Key_1$ to the encryption circuit.

Then, at block 514, the encryption circuit performs the encryption as described above, including modifying the encrypted tweak value for the second and subsequent AES block cipher encryption circuits, and performing each step of the data encryption. Each data block is preferably encrypted in parallel with the other blocks immediately upon receipt of the modified encrypted tweak value required at the respective AES block cipher encryption circuit. The encrypted write data is then loaded to the data buffer. ECC coding is also calculated for the encrypted write data and loaded to the data buffer at block 514.

Figure 6:
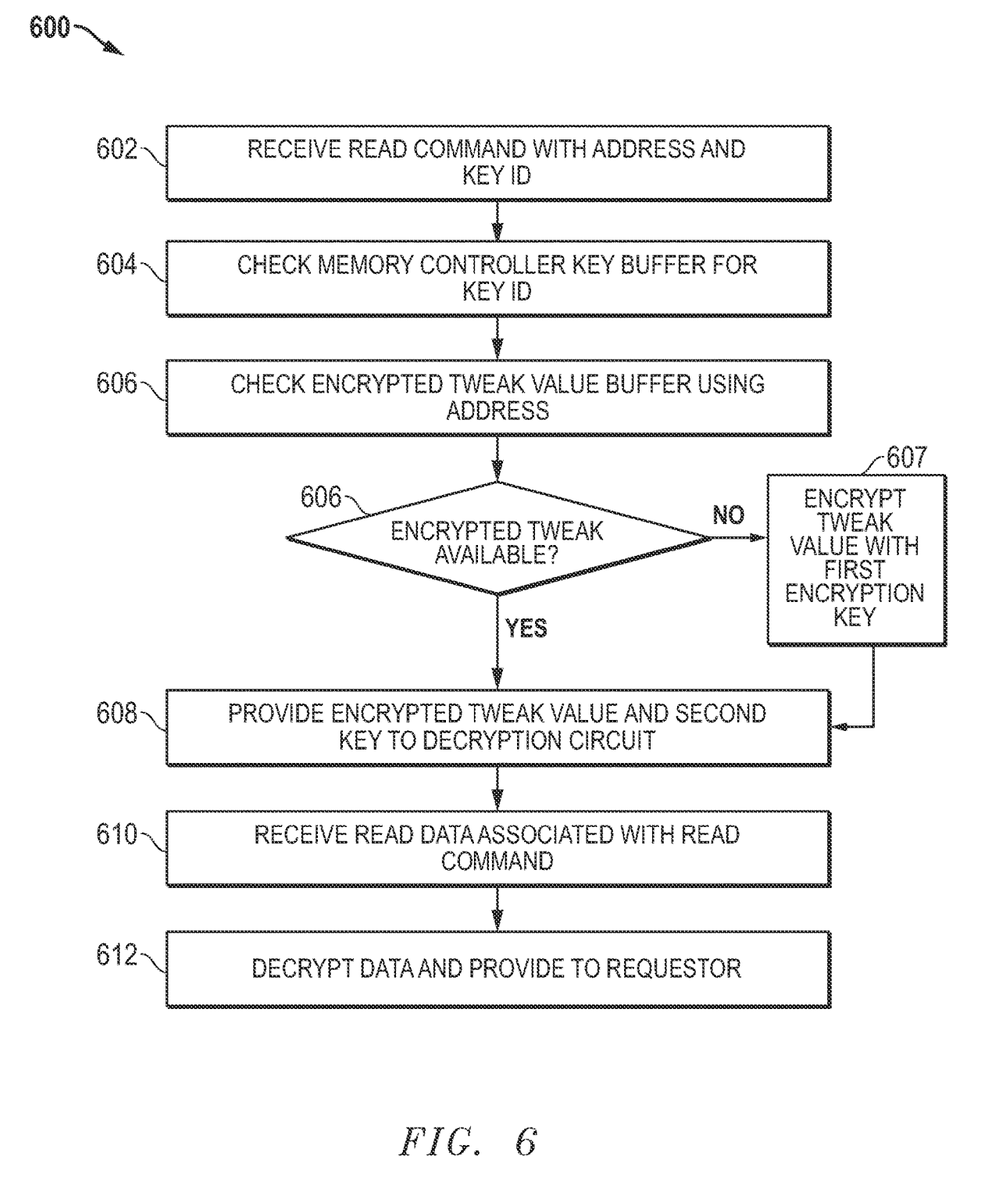
FIG. 6 shows a flowchart of a process for operating a decryption circuit like that of FIG. 4 for decrypting data associated with a read command according to some embodiments.

FIG. 6 shows a flowchart 600 of a process for operating a decryption circuit like that of FIG. 4 for decrypting data associated with a read command according to some embodiments. At block 602, a read command or request is received at the memory controller including an associated address from which data is to be read, and a key ID for an encryption key for decrypting the read data.

At block 604, the process checks the memory controller key buffer to see if the encryption keys for the key ID is held there. The key buffer is typically the same buffer employed for the encryption process of FIG. 5 because the same keys are used for encryption and decryption. As discussed above, a key ID may be associated with just the data encryption key ($Key_1$) or both keys. If the keys are not available, they are obtained by request to the security processor or an error is reported for the read command.

At block 606 the process checks the encrypted tweak value buffer to see if an encrypted tweak value is already calculated and stored for the address of the write command. If not, the process goes to block 607 where it provides the tweak value based on the address of the write command, and encrypts it with AES block cipher encryption circuit 402 (FIG. 4), and then goes to block 608. If an encrypted tweak value is available at block 606, the process goes to block 608.

At block 608, the process provides the encrypted tweak value and the encryption key $Key_1$ to the AES block cipher decryption circuit 410 for decrypting the read data. At block 610, the process receives read data from the RAM memory responsive to the read command. Then at block 612, the read data is provided to decryption circuit 400, and decrypted according to the process described with respect to FIG. 4. The memory controller then responds to the read command by providing the decrypted read data.

Figure 7:
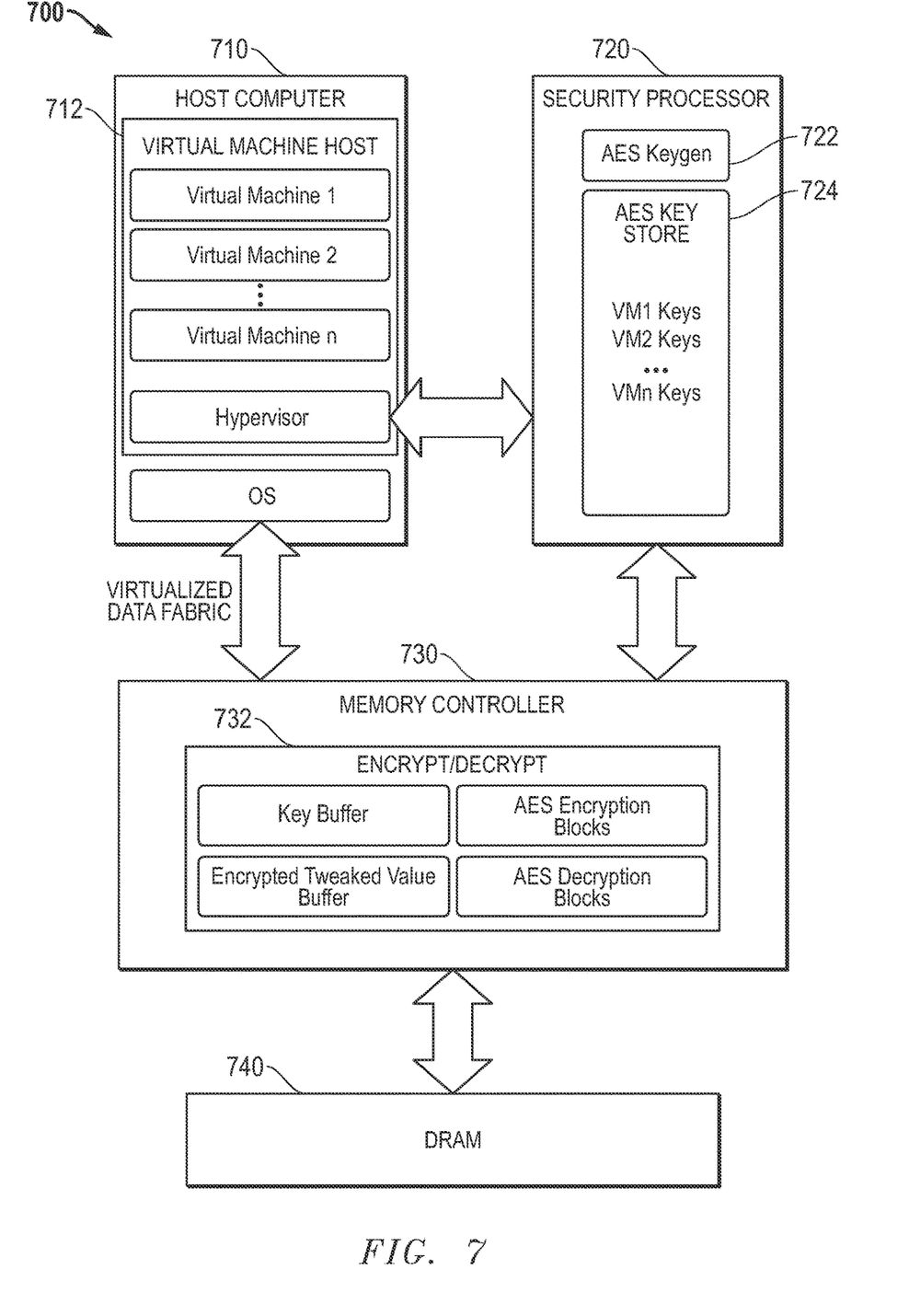
FIG. 7 is a partial block diagram of a virtual machine system using a memory encryption process a described herein according to some embodiments.

FIG. 7 is a partial block diagram of a virtual machine system 700 using a memory encryption process as described herein according to some embodiments. Virtual machine system 700 is generally a data processing system such as APU 100 (FIG. 1) including applications for providing virtual machines and one or more network interfaces for connecting to a network for providing access to the virtual machines. The virtual machines use the memory encryption scheme described above, with different encryption keys. The virtual machines typically act as network servers hosting suitable applications or services, or act as remote workstations over the network.

Virtual machine system 700 includes a host computer 710, a security processor 720, a memory controller 730, and a DRAM memory 740. Host computer 710 executes a host operating system (OS) on which a virtual machine host 712 is integrated into the OS or runs as an application. Virtual machine host application 712 spawns and manages virtual machines though a Hypervisor application. Each depicted virtual machine ("Virtual Machine 1", "Virtual Machine 2", "Virtual Machine n") is an instance of an operating system with running applications, and uses the Hypervisor to access system functions such as memory and network communications. Various virtual machine architectures are known that may be employed with the techniques herein, including those with customized hardware to support hypervisor operations. Virtual machine host 712 is in communication with security processor 720 over a system management network such as SMN (FIG. 1). Virtual machine host 712 is also in communication with memory controller 730 over a data fabric or other communication bus such as data fabric 125. In some embodiments, the data fabric is a distributed data fabric with a memory controller on a separate machine or module.

Security processor 720 may be a dedicated processor or integrated with a system management processor such as SMU 180, and is in communication with the Hypervisor and with memory controller 730. Typically security processor 720 will include secure firmware for managing and verifying system updates, data security, and secure communications include issuing keys and validating public key encryption keys for various applications and system processes. Only the portions of security processor 720 necessary to describe a key management arrangement for memory encryption circuits herein. Depicted are an AES key generator 722 ("AES Keygen") and an AES key store 724. AES keygen 722 generates a set of memory encryption keys for a virtual machine when the virtual machine is initialized. In other embodiments, keys may be generated elsewhere and allocated from a local or remote key store. The generated keys include at least a $Key_1$ and $Key_2$ for each virtual machine, as depicted by the keys in key store 724 labeled "VM1 Keys", "VM2 Keys", through "VMn Keys". The keys are identified by a key ID in the key buffer, which is preferably provided by the hypervisor to the memory controller when a virtual machine accesses the memory. Multiple sets of $Key_1$ and $Key_2$ values may be generated or provided for each virtual machine. For example, a unique set of keys may be provided for each of multiple applications running on a virtual machine, or multiple processes. Security processor 720 and memory controller 730 are provided with firmware for securely communicating the keys when they are loaded to memory controller 720.

Memory controller 730 includes a encryption and decryption block 732 including encryption and decryption circuits such as those depicted in FIG. 3 and FIG. 4, a key buffer, an encrypted tweak value buffer, and control circuitry necessary to manage loading data and keys according to the processes depicted in FIG. 5 and FIG. 6. The memory controller of FIG. 2 is suitable for implementing memory controller 730. The process of loading and managing keys for each virtual machine in virtual machine host 712 is further described with respect to FIG. 8. As discussed above, while AES encryption is employed in this embodiment, other embodiments may include a different type of encryption in the block cipher encryption blocks of FIG. 3 and FIG. 4, which employ a similar structure to that depicted here with a different type of key store. As discussed above, other types of block cipher encryption are used in various embodiments.

Figure 8:
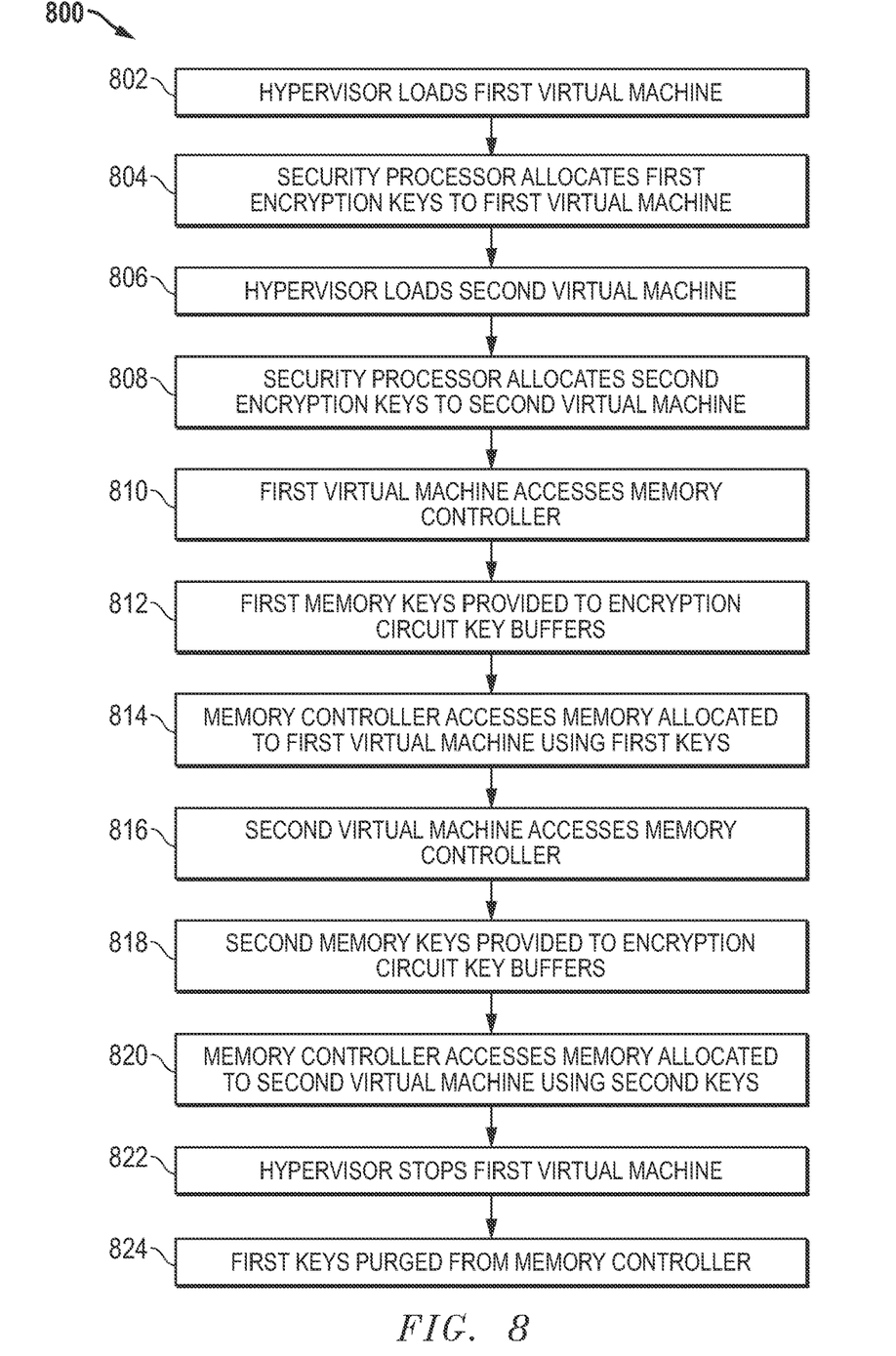
FIG. 8 shows a flowchart of a process scenario for managing encryption keys of virtual machines at a memory controller.

FIG. 8 shows a flowchart 800 of a process scenario for managing encryption keys of virtual machines at a memory controller. The depicted scenario is only an example to illustrate a pair of virtual machines provided with memory that is encrypted and secure from access by the other virtual machine. In actual operation, several more virtual machines are typically instantiated, and virtual machines are added and removed as the virtual machine host continues to operate.

As shown at block 802, the hypervisor loads a first virtual machine ("VM"). During initialization of the virtual machine, security processor 720 allocates a first set of encryption keys to the first virtual machine at block 804, along with a designated memory address range for use as working memory by the virtual machine. Similarly, a second virtual machine is loaded at block 806, and the security processor allocates a second set of encryption keys and a memory address range to the second virtual machine at block 808. Of course, the key sets have all different keys unless some special arrangement is made for sharing memory between virtual machines.

At block 810, the first virtual machine accesses memory controller 730 through sending memory access requests on a virtualized data fabric interface provided by the Hypervisor. Such accesses are typically provided in time divided slots in which each virtual machine is allowed access to memory resources. Other architectures support on demand access to memory controller 730 through the hypervisor, with the hypervisor preventing one virtual machine from reading or writing to the system memory address range allocated to a different virtual machine. To support access in either architecture, the first set of memory keys are provided to the key buffer at block 812. (The depicted blocks may not always occur in the order shown). At block 814, the memory controller accesses the memory address range allocated to the first virtual machine using the first set of encryption keys to fulfill memory access requests from the first virtual machine.

Next at block 816, the second virtual machine accesses memory controller 730 through sending memory access requests on a virtualized data fabric interface provided by the Hypervisor. The second set of memory keys are provided to the key buffer at block 818. At block 820, the memory controller accesses the memory address range allocated to the second virtual machine using the second set of encryption keys to fulfill memory access requests from the second virtual machine. In this condition the memory controller key buffer includes keys for both virtual machines, accessible using their key ID which is provided by the hypervisor.

At block 822, the hypervisor stops the first virtual machine. Then at block 824 the first keys are purged from the encryption and decryption circuits of memory controller 730. In some embodiments, the key buffer and the encrypted tweak value buffer may also be purged at block 824 to remove the first set of encryption keys and the encrypted tweak values that were encrypted with any of the first set of encryption. The key ID that was allocated to the first virtual machine may then be employed for a new virtual machine instantiation.

Memory controller 200 of FIG. 2 or any portions thereof, such as arbiter 238, encryption circuit 300, and decryption circuit 400, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the internal architecture of memory channel controller 210 and/or power engine 250 may vary in different embodiments. Memory controller 200 may interface to other types of memory besides DDRx, such as high bandwidth memory (HBM), RAMbus DRAM (RDRAM), and the like. While the illustrated embodiment showed each rank of memory corresponding to separate DIMMs or SIMMs, in other embodiments each module can support multiple ranks. Still other embodiments may include other types of DRAM modules or DRAMs not contained in a particular module, such as DRAMs mounted to the host motherboard. Accordingly, it is intended by the appended claims to cover all modifications of the disclosed embodiments that fall within the scope of the disclosed embodiments.

What is claimed is:

1. A method, comprising:
   at a memory controller, receiving a write command having an address and write data to be written to the address in a RAM memory;
   providing a tweak value based at least on the address;
   encrypting the tweak value with a block cipher encryption circuit using a first key to produce an encrypted tweak value;
   encrypting a first block of the write data by manipulating it based on the encrypted tweak value using a first digital circuit, encrypting a first result thereof with a second key at a first block cipher encryption circuit, and then manipulating a second result thereof based on the encrypted tweak value again using a second digital circuit to provide a first block of encrypted write data;
   for at least one subsequent block of write data:
      modifying the encrypted tweak value; and
      encrypting the subsequent block of write data by manipulating it based on the modified encrypted tweak value, encrypting a third result thereof with the second key using a subsequent block cipher encryption circuit, and then manipulating a fourth result thereof with the modified encrypted tweak value to provide a subsequent block of encrypted write data;
   loading the first and subsequent blocks of encrypted write data to a data buffer;
   selecting the write command for transmission to the RAM memory with an arbiter circuit;
   transmitting the write command and the first and subsequent blocks of encrypted write data to the RAM memory;
   executing by a virtual machine host at least a first virtual machine and a second virtual machine; and
   holding AES keys at a key manager for the first virtual machine and the second virtual machine, the key manager providing a first set of keys for use by the encryption circuit for the first virtual machine, and a different second set of keys for use by the encryption circuit for the second virtual machine, wherein the virtual machine host causes the first set of keys to be purged from the memory controller when changing operation of the memory controller from operation under control of the first virtual machine to operation under control of the second virtual machine.

2. The method of claim 1, wherein manipulating the write data and the second result comprises XOR-ing the write data and the second result, respectively, with the encrypted tweak value.

3. The method of claim 1, wherein three subsequent blocks of write data are encrypted for each write command.

4. The method of claim 1, wherein the first block cipher encryption circuit is an Advanced Encryption Standard (AES) block cipher encryption circuit.

5. The method of claim 1, further comprising, each time the encrypted tweak value is modified, modifying the encrypted tweak value using a separate Galois field multiplication circuit.

6. The method of claim 1, further comprising generating a respective encrypted tweak value in response to the memory controller receiving a respective write command, and storing the encrypted tweak value in a buffer for use when the write data for the write command is received.

7. The method of claim 1, further comprising storing the first and subsequent blocks of encrypted write data in a data buffer.

8. The method of claim 1, further comprising:
in response to a read command, reading the encrypted write data from the RAM memory and providing it to the memory controller as read data;
providing the encrypted tweak value;
decrypting a first block of the read data by manipulating it based on the encrypted tweak value using a third digital circuit, decrypting a first result thereof with the second key at a block cipher decryption circuit, and then manipulating a second result thereof based on the encrypted tweak value again using a fourth digital circuit to provide a first block of decrypted write data;
for at least one subsequent block of the read data:
modifying the encrypted tweak value to produce a modified encrypted tweak value; and
decrypting the subsequent block of the read data by manipulating it based on the modified encrypted tweak value, decrypting a third result thereof based on the second key using a subsequent block cipher decryption circuit, and then manipulating a fourth result thereof based on the modified encrypted tweak value to provide a subsequent block of decrypted write data.

9. The method of claim 8, further comprising, in response to the memory controller receiving the read command, checking a stored set of encrypted tweak values each associated with respective memory addresses to determine whether a respective encrypted tweak value for the read command is present, and if not, causing an encrypted tweak value to be produced based on the address of the read command.

10. A data processing system, comprising:
a data processor;
a data fabric coupled to the data processor; and
a memory controller coupled to the data fabric, the memory controller comprising:
a data buffer;
an encryption circuit coupled to the data buffer for encrypting write data of a write command to be written to a RAM memory, the encryption circuit comprising:
a first block cipher encryption circuit including a first input receiving a first key and a second input receiving a tweak value based at least on an address of the write command, and an output providing an encrypted tweak value;
a second block cipher encryption circuit receiving a second key, the encrypted tweak value, and a first block of the write data, and encrypting the first block of the write data by manipulating the write data based on the encrypted tweak value, encrypting a first result thereof with the second key, and then manipulating a second result thereof based on the encrypted tweak value again to provide a first block of encrypted write data; and
at least one subsequent block cipher encryption circuit receiving the second key, a modified encrypted tweak value from a prior one of the block cipher encryption circuits, and a subsequent block of the write data, and encrypting the subsequent block of write data by manipulating the subsequent block of write data based on the modified encrypted tweak value, encrypting a third result thereof with the second key, and then manipulating a fourth result thereof based on the modified encrypted tweak value again to produce a subsequent block of encrypted write data; and
a virtual machine host executing at least a first virtual machine and a second virtual machine, and a key manager holding AES keys for the first virtual machine and the second virtual machine, the key manager providing a first set of keys for use by the encryption circuit for the first virtual machine, and a different second set of keys for use by the encryption circuit for the second virtual machine, wherein the virtual machine host causes the first set of keys to be purged from the memory controller when changing operation of the memory controller from operation under control of the first virtual machine to operation under control of the second virtual machine.

11. The data processing system of claim 10, wherein manipulating the write data and the first and second results comprises XOR-ing the write data and the first and second results, respectively, with the encrypted tweak value.

12. The data processing system of claim 10, wherein the encryption circuit further comprises a buffer storing a set of encrypted tweak values each associated a respective memory address, wherein the first block cipher encryption circuit generates a respective encrypted tweak value in response to the memory controller receiving a respective write command, and stores the respective encrypted tweak value for use when the write data for the respective write command is received.

13. The data processing system of claim 10, wherein the first block cipher encryption circuit is an Advanced Encryption Standard (AES) block cipher encryption circuit.

14. The data processing system of claim 10, wherein the memory controller comprises a decryption circuit for receiving and decrypting read data comprising the first and subsequent blocks of encrypted write data from the RAM memory in response to a read command, the decryption circuit comprising:
a block cipher decryption circuit receiving the second key, the encrypted tweak value, and a first block of read data, and encrypting the first block of the write data by manipulating it based on the encrypted tweak value, decrypting a first result thereof with the second key, and then manipulating a second result thereof based on the encrypted tweak value again to provide a first block of decrypted read data; and at least one subsequent block cipher decryption circuit receiving the second key, a modified version of the encrypted tweak value from a prior one of the block cipher decryption circuits, and a subsequent block of the read data, and decrypting the subsequent block of write data by manipulating it based on the modified encrypted tweak value, decrypting a first result thereof with the second key, and then manipulating a second result thereof based on the modified encrypted tweak value again to produce a subsequent block of decrypted read data.

15. The data processing system of claim 14, wherein the block cipher decryption circuit is operable to, in response to the memory controller receiving the read command, check a stored set of encrypted tweak values each associated with respective memory addresses to determine whether an encrypted tweak value for the read command is present, and if not, cause an encrypted tweak value to be produced based on the address of the read command.

\* \* \* \* \*